United States Patent Office 2,959,604
Patented Nov. 8, 1960

2,959,604

CYCLOMATIC COMPOUNDS

Jerome E. Brown, Detroit, Earl G. De Witt, Royal Oak, and Hymin Shapiro, Detroit, Mich., assignors to Ethyl Corporation, New York, N.Y., a corporation of Delaware No Drawing. Filed Oct. 3, 1956, Ser. No. 613,592

5 Claims. (Cl. 260—429)

This invention relates to a class of novel organometallic compounds and processes for their manufacture. More particularly, the present invention relates to novel and useful metallic acyl cyclomatic compounds. Our invention specifically resides in providing novel acyl cyclomatic manganese tricarbonyl compounds of improved antiknock quality and antiknock fluids and fuels containing the same.

As will be apparent from the discussion hereinafter the metallic cyclomatic compounds of the present invention comprising a novel class of organometallic compounds have properties which render them of particular utility as additives. In the preparation of organometallic compounds for such use the properties of stability, volatility, and solubility are of considerable importance. Stability is important in the synthesis and storage of the compounds because additives having low stabilities often decompose in the presence of water, atmospheric constituents such as oxygen and carbon dioxide, and other gases frequently encountered such as sulfur dioxide and hydrogen sulfide. The importance of thermal stability becomes apparent from the fact that the resulting fuel or lubricant compositions frequently encounter diverse conditions of temperature such as those prevalent in tropic, temperate and artic regions, as well as seasonal fluctuations in temperature in a specific region. Solubility is of considerable importance for ease of blending and in obtaining homogeneous compositions which remain compatible during long periods of storage. The importance of volatility is apparent from a consideration of the fact that volatility has considerable influence on engine inductibility, that is, the character of a fuel composition to readily undergo operations such as carburetion, manifolding and injection utilized to introduce or induct such compositions into internal combustion engines.

But for a few noteworthy substances, such as tetraethyllead and iron carbonyl, the state of the art has not advanced sufficiently to permit the preparation and isolation of "tailor made" organometallic substances having the necessary characteristics of stability, volatility and solubility. It is evident, therefore, that the state of the art will be greatly enhanced by providing a class of organometallic compounds capable of being modified to meet the requirements of fuel and oil additives.

It is, therefore, an object of this invention to provide as new compositions of matter a novel class of organometallic compounds. Another object of the present invention is to provide a class of metallic acyl cyclomatic compounds of particular utility as fuel additives. It is also an object of this invention to provide antiknock agents, and fluids and fuels containing the same, which greatly enhance the octane rating of gasoline. It is a further object of this invention to provide fuels suitable for use in high efficiency spark ignition internal combustion engines requiring a fuel of high antiknock quality. A further object of this invention is to provide means for operating an internal combustion engine on a fuel containing mixture of antiknock additives in a manner wherein the advantages of the antiknock are utilized to a maximum degree with a minimum of deleterious effect. Further objects of this invention will be apparent from the discussion which follows.

The above and other objects of this invention are accomplished by providing novel acyl cyclomatic manganese tricarbonyl compounds, as well as lubricating oils, antiknock fluids, and hydrocarbon fuels containing these new compounds in small amounts sufficient to improve the engine operating characteristics, antiknock properties, and combustion characteristics of said fuels, oils and fluids.

The acyl cyclomatic manganese tricarbonyl compounds of this invention have the general formula

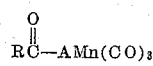

wherein A is a cyclomatic hydrocarbon radical having from 5 to 9 or more carbon atoms which embodies a group of 5 carbons having the configuration found in cyclopentadiene, R is an organic hydrocarbon radical, said compounds being further characterized in that the cyclomatic hydrocarbon radical is bonded to the manganese by carbon-to-manganese bonds through carbons of the cyclopentadienyl group. The novel compounds as a whole have a total of from 10 to 20 or more carbon atoms. It is found that our new compounds have desirable solubility characteristics for use as additives in hydrocarbon fuels. A preferred group of compounds of this invention are those having from 10 to about 16 carbon atoms, as these are found to have the best inductibility charcteristics when used in fuels in multicylinder engines.

The compounds of this invention are used as hydrocarbon fuel and lubricating oil additives. When added to hydrocarbon fuels, they act as antiknock agents enhancing the octane quality both of clear fuels and fuels containing other additives including other antiknock additives such as, for example, tetraethyllead. The compounds of this invention can be added directly to the fuel in the pure form or they can be first blended with other components such as scavengers, solvents, antioxidants, etc., into concentrated fluids and these fluids may then be added in the required amounts to fuels to obtain the finished fuel having an enhanced antiknock quality. When the novel acyl cyclomatic manganese compounds are employed in fuels as, for example, in hydrocarbon fuels of the gasoline boiling range, the amount employed per gallon of fuel varies depending on the enhancement in antiknock quality desired. Thus, the amount can range from about 0.015 to about 10 grams of manganese per gallon of fuel in the form of a compound of this invention. When the novel compounds of this invention are employed in amounts equivalent to 0.015 gram of manganese per gallon of fuel, an enhancement in the antiknock value of the fuel is observed over that of the clear fuel. Concentrations of our additives equivalent to amounts greater than 10 grams of manganese per gallon can also be used, however, because of the extreme antiknock effectiveness of our compounds, it is usually not necessary to go above this figure. A preferred range of concentrations of our compounds in hydrocarbon fuels is from about 0.03 to about 6 grams of manganese per gallon as it is seldom necessary to go beyond these limits to obtain excellent antiknock effect.

The antiknock enhancement provided by the compounds of this invention is illustrated by the following result. When manganese in the form of acetyl methylcyclopentadienyl maganese tricarbonyl, a new compound of this invention, is added to a test fuel in concentrations equivalent to two grams of manganese per gallon of fuel, the antiknock quality of the fuel, as determined by rating in a standard CFR single-cylinder knock test engine according to ASTM test procedure D-908-51, is increased from 77.2 to 91.8 octane number units. To obtain the same increase in antiknock quality with tetraethyllead would require about 4.75 grams of lead per gallon. Thus, manganese in the form of our compounds is 237 percent as effective as lead in the form of tetraethyllead in increasing the octane value of hydrocarbon fuels.

Reference to the generic formula described hereinabove indicates that there are three primary constituents in the new compositions of matter of the present invention. These are first the acyl cyclomatic constituent

second the metallic constituent Mn, and third the electron donating group CO.

The primary constituent of the new compositions of matter of the present invention designated by the symbol

in the general formula presented hereinbefore comprises an acyl cyclomatic radical, that is, a cyclopentadiene-type radical which is a hydrocarbon radical containing the cyclopentadienyl moiety substituted with an acyl group. In the above formula R represents an organic hydrocarbon group having from 1 to about 12 carbon atoms selected from the group consisting of alkyl, aryl, alkaryl, aralkyl, cycloalkyl radicals and the like. The compounds of this invention, therefore, have a formula corresponding to one of the following:

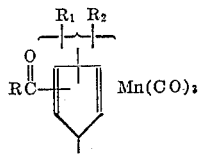

or

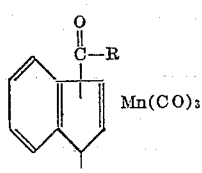

Thus, examples of the compounds of this invention include acetylcyclopentadienyl manganese tricarbonyl, $CH_3COC_5H_4Mn(CO)_3$, methylpropionylcyclopentadienyl manganese tricarbonyl $$CH_3CH_2COC_5H_3(CH_3)Mn(CO)_3$$

benzoylcyclopentadienyl manganese tricarbonyl $$C_6H_5COC_5H_4Mn(CO)_3$$

3-methyl-5-ethylbenzoylisopropylcyclopentadienyl manganese tricarbonyl $$C_2H_5CH_3C_6H_3COC_5H_3CH(CH_3)_2Mn(CO)_3$$

β,β-dietheylpropionylindenyl manganese tricarbonyl $$CH_3C(CH_3)_2COC_9H_6Mn(CO)_3$$

benzylacetylcyclopentadienyl manganese tricarbonyl, $$CH_3COC_5H_4CH_2C_6H_5Mn(CO)_3$$

3-n-propyl-6-ethylbenzoylcyclopentadienyl manganese tricarbonyl, $C_3H_7C_2H_5C_6H_3COC_5H_4Mn(CO)_3$, and the like.

A general method for the preparation of the acyl cyclomatic compounds of the instant invention comprises the introduction into a metallic compound of an acyl cyclomatic group or groups, followed by the introduction into the resulting intermediate compound of secondary groups designated herein as electron donating groups, namely, CO. A variation of this type of reaction comprises reacting manganese in a suitable active form with an acyl cyclomatic hydrocarbon or a metallic acyl cyclomatic compound to form an intermediate metallic acyl cyclomatic compound followed by the introduction therein of electron donating groups, namely, CO.

This general method for the preparation of the compounds of the instant invention is generally conducted in two steps. The first step involves the formation of an intermediate acyl cyclomatic manganese compound by the reaction of an active acyl cyclomatic metal compound, such as acyl cyclomatic magnesium halides, acyl cyclomatic alkali metal compounds, acyl cyclomatic zinc halides, and the like with a compound of manganese. The second step which, in this case, is conducted subsequent to the first involves reacting the aforesaid intermediate with or without prior isolation so as to introduce therein the electron donating carbonyl groups. The reactions involved in the second step can be conducted in either the liquid phase at atmospheric pressure or thereabove, or in the gaseous or vapor phase under suitable conditions of temperature and pressure.

One preferred preparative embodiment of this invention is to react an acyl cyclomatic manganese compound in which the acyl cyclomatic group has from 7 to about 17 carbon atoms and which embodies five carbons having the general configuration found in cyclopentadiene, such as bis(acetylcyclopentadienyl)manganese, with carbon monoxide at pressures of substantially zero to about 50,000 p.s.i. and at temperatures of substantially zero to about 350° C.

The acyl cyclomatic manganese compound which is used in the preparation of the compounds of our invention is prepared by the reaction of an acyl cyclomatic alkali metal compound with a manganese salt of an organic or inorganic acid, preferably the respective manganous salts. Examples of these manganese salts are manganous acetate, manganous benzoate, manganous carbonate, manganous oxalate, manganous lactate, manganous nitrate, manganous phosphate, manganic phosphate, manganous sulfate, manganous fluoride, manganous chloride, manganous bromide, and manganous iodide, and the like. In addition, manganese salts of β-diketones, such as tris(2,4-pentanedione)manganese and tris(2,4-hexanedione)manganese may also be employed, as well as manganese salts of β-keto esters, such as the manganese salts of ethylacetoacetate, and the like. An example of this is the reaction of propionylcyclopentadienyl sodium with manganous halide to give bis(propionylcyclopentadienyl)manganese. Acyl cyclomatic alkali metal compounds are also reacted with naturally occurring manganese ores, such as manganosite (MnO), manganese dioxide ($MnO_2$), manganic sesquioxide ($Mn_2O_3$), manganous sulfide (MnS), manganic sulfide ($MnS_2$), rhodochrosite ($MnCO_3$), and the like, to give bis(acyl cyclomatic) manganese compounds such as bis(butanoylmethylcyclopentadienyl)manganese, etc. The acyl cyclomatic manganese compound can be separated from the reaction mixture by distillation or other conventional methods and subsequently reacted with carbon monoxide, either with or without a solvent, or, the reaction mixture containing the acyl cyclomatic manganese compound is subjected to reaction with carbon monoxide as above to give a reaction product containing the acyl cyclomatic manganese tricarbonyl compound such as, for example, n-hexanoylcyclopentadienyl manganese tricarbonyl. The latter can then be separated by conventional methods.

The acyl cyclomatic alkali metal compound used in the preparation of the compounds of this invention is synthesized by reaction of an acyl cyclomatic compound with an alkali metal or alkali metal amide. To the acyl cyclomatic alkali metal compound, which is preferably contained in a suitable solvent such as tetrahydrofuran, is added the manganous salt and the resulting acyl cyclomatic manganese compounds are reacted with carbon monoxide either in the reaction mixture or else in the pure state after separation as indicated above.

Another embodiment of this invention comprises introducing an acylcyclopentadiene into a mixture of manganous salt and alkali metal and reacting the mixture thus obtained with carbon monoxide to produce the acyl cyclomatic manganese tricarbonyl compounds of this invention. The product can be separated from the reaction mixture by solution in a solvent, such as an ether, and the removal of the solid impurities by filtration, centrifugation, and the like. The product can also be separated from the reaction mixture by steam distillation or selective solvent extraction. The solvent may be removed from the product by fractional distillation and the product further purified by fractional distillation or sublimation. The methods of preparation are further illustrated in the following examples in which all parts are by weight.

Example I

A reaction vessel equipped with means for charging and discharging liquids and solids, gas inlet and outlet means, temperature measuring devices, heating and cooling means, means for agitation, and means for condensing vapors, is flushed with pre-purified nitrogen. To the flask is then added 400 parts of tetrahydrofuran and 23 parts of sodium dispersed in 23 parts of mineral oil. An atmosphere of nitrogen is maintained in the reaction vessel throughout the run. The vessel is cooled to 10° C. and 123 parts of methylacetylcyclopentadiene are added in small increments with agitation while maintaining the temperature below 15° C. After the addition of the methylacetylcyclopentadiene, the temperature is allowed to rise to 23° C. over a period of about two hours when the completion of the formation of the sodium methylacetylcyclpentadiene is evidenced by the cessation of hydrogen evolution. To this solution of methylacetylcyclopentadienyl sodium in tetrahydrofuran is added 63 parts of anhydrous manganous chloride. The mixture is heated and maintained at reflux temperature for 20 hours and is then cooled and charged under a nitrogen atmosphere to a pressure resistant vessel which has been flushed with pre-purified nitrogen. The vessel is equipped with gas inlet and outlet valves, temperature and pressure measuring devices, heating and cooling means, and means for agitation. The vessel is pressured with carbon monoxide to about 2000 p.s.i.g. at 26° C. and then the temperature is slowly raised to 158° C. The reaction between the CO and $(CH_3COC_5H_3CH_3)_2Mn$ is conducted at a temperature within the range of 22° C.–158° C. and at a pressure ranging from 1160 to 2800 p.s.i.g. for a period of about 7 hours. The excess CO is then released below 30° C. and the reaction mixture is removed from the vessel. The solids are removed by filtration and the residue washed with ether to remove the last traces of product which is soluble in the ether. The solution is then fractionally distilled at a reduced pressure of 17 millimeters through a helix packed column. The fraction boiling at 160° C. is methylacetylcyclopentadienyl manganese tricarbonyl which gives an analysis close to that calculated for $C_{11}H_9MnO_4$, viz, C=50.8%; H=3.46%; Mn=21.2%.

This compound gives an immediate positive test for carbonyl groups with 2,4-dinitrophenyldrazine. The infra-red curve also confirms the presence of a ketonic carbonyl group.

Example II

The procedure of Example I is followed employing 400 parts of tetrahydofuran, 23 parts of sodium dispersed in 23 parts of mineral oil, 184 parts of benzoylmethylcyclopentadiene, and 63 parts of powdered $MnCl_2$. The manganous chloride is added to the benzoylmethylcyclopentadienyl sodium solution at a temperature of 20° C. After maintaining the mixture at reflux temperature for two hours, the intermediate containing bis (benzoylmethylcyclopentadienyl) manganese is transferred under nitrogen to the pressure resistant vessel and the vessel charged with CO and heated from about 22° C.–148° C. at 680 to 2175 p.s.i.g. The reaction is essentially completed in about 1 hour as indicated by the cessation of CO uptake. The vessel is then cooled, the product mixture removed, and the resultant product— benzoyl-methylcyclopentadienyl manganese tricarbonyl— purified by extraction into ether followed by evaporation of the low boiling liquids under reduced pressure. The residue is then recrystallized from petroleum ether and sublimed at 90° C. and 1 millimeter. The product, a yellow crystalline solid melts at 115–119° C. and gives a good analysis for the calculated C, H and Mn content; viz, 59.7%, 3.41% and 17.1% respectively.

The process of Example II is repeated except that the intermediate reaction mixture is reacted with carbon monoxide at a temperature of substantially 34° C. and a pressure of about 1195–2000 p.s.i. A good yield of benzoylmethylcyclopentadienyl manganese tricarbonyl results.

A variation of Example II, by which the same product is prepared, consists of adding benzoylmethylcyclopentadiene to a mixture of manganous chloride and sodium dispersed in mineral oil and then reacting the mixture thus obtained with carbon monoxide to get a good yield of benzoylmethylcyclopentadienyl manganese tricarbonyl.

Example III

Carbon monoxide is reacted with bis (propionylcyclopentadienyl) manganese in tetrahydrofuran at substantially 170° C. and 400–500 p.s.i.g. over a period of about 5 hours. The reaction mixture is then discharged into about 800 parts of water and steam distilled, taking off the tetrahydrofuran first and the product next. The product is separated from the water layer and purified by distillation at reduced pressures. A good yield of propionylcyclopentadienyl manganese tricarbonyl product is obtained.

Good yields are also obtained when pressures of carbon monoxide below one atmosphere are employed.

The process outlined above is applicable to other compounds of this invention. Thus, by starting with acetylindene, acetylindenyl manganese tricarbonyl is prepared by the process described in Example I. Further, propionylethenylcyclopentadienyl manganese tricarbonyl is prepared in this manner by starting with propionylethenylcyclopentadiene.

The temperature of the steps in the process illustrated by the above examples may be varied. For example, the reaction of sodium with the acyl cyclomatic compound can be performed at temperatures up to the boiling point of the cyclomatic compound. A preferred range of temperatures is from about 10° C. to about 65° C. when conducting the reaction in a solvent, such as tetrahydrofuran. The upper temperature represents the boiling point of tetrahydrofuran. The manganese salt, i.e., $MnCl_2$, $MnBr_2$, or $MnSO_4$, etc., is conveniently added to the alkali metal acyl cyclomatic compound at temperatures ranging from −20 to 65° C. and higher, depending on the boiling point of the solvent, and since there is no great temperature rise upon addition of the manganese halide, the temperature limits are not critical. However, it is preferred to conduct this reaction at a temperature of from 20–65° C. in order to cut down the time of reaction. The reaction mixture need not be refluxed; however, reflux periods up to 16 hours are employed with good success.

The temperature at which CO reacts with the intermediate bis (acylcyclomatic) manganese compound varies from 0° C. to about 350° C. with the rate of reaction increasing as the temperature is increased. The temperature of the reaction depends on the freezing point of the intermediate bis(acylcyclomatic) manganese compound or the freezing point of the solvent employed, if any, and also upon the pressure. An especially preferred range of temperatures for the carbonylation of the cyclomatic manganese intermediate is from 20 to about 200° C., as temperatures within this range are easily maintainable and good yields are realized.

Carbon monoxide reacts with the acylcyclomatic manganese compound to form the acylcyclomatic manganese tricarbonyl compounds at pressures below atmospheric to as high as 50,000 p.s.i. and higher. However, a preferred range of pressures at which the reaction can be conducted is from about 10 to about 10,000 p.s.i.g., as no great advantage is gained by going to higher pressures, and at pressures below about 10 p.s.i.g. the time required to obtain a given amount of product is considerably lengthened. An especially preferred range of pressures for the carbonylation of acylcyclomatic manganese compounds according to this invention is from 20 to about 1000 p.s.i., as it is found that this reaction proceeds quite readily and can be conducted in moderate-pressure apparatus.

The time of reaction of any part of the processes depends on temperature and pressure conditions, etc., and will vary over a wide range. Therefore, the time of reaction can vary from several minutes to a few hours, such as 4 hours. The time for reaction between the acylcyclomatic manganese compound and CO can also vary within wide limits, depending on temperature, pressure, and the extent of reaction that is desired. Thus, at high pressures and temperatures the reaction goes to completion in a matter of a few minutes, while at lower pressures and temperatures it may be advantageous to keep the CO in contact and in agitation with the acylcyclomatic manganese compound for a period of 1–10 hours.

Solvents other than tetrahydrofuran, ether, and benzene are useable in the above described process for the preparation of the compounds of this invention. Such other solvents, or mixtures thereof, which are conveniently employed are n-butyl ether, dioxane, toluene, and dimethyl ether of ethylene glycol. Solvents are not essential for the conduction of the reaction of carbon monoxide with the acylcyclomatic manganese compounds to produce the cyclomatic manganese tricarbonyl compounds, but are preferred as an easily workable reaction mass results from their use.

The alkali metals used in the above process to make the metal derivatives of the acylcyclomatic compounds which are then reacted with a manganese compound to make the cyclomatic manganese compound include lithium, sodium, potassium, rubidium, and cesium. Metals other than the alkali metals that can be used are the group IIA metals such as beryllium, magnesium, calcium, strontium, and barium, and group IIB metals such as zinc and cadmium.

The product recovery procedure employed depends on the method of preparation and on the compound synthesized. A method of separation is to steam distill the reaction mixture, separate the organic product layer from the aqueous layer and further purify the product by fractional distillation at reduced pressures. This method is employed with good success when the carbon monoxide is reacted with the intermediate from its reaction mixture. Another method of separation involves extraction of the acylcyclomatic manganese tricarbonyl compound from the reaction mixture with selective solvents such as benzene, ether, etc., and the separation of the product from the solvent by fractional distillation followed by further purification consisting of either fractional distillation, sublimation, or both.

In the above examples the acylcyclomatic alkali metal compound was prepared by reaction of the cyclomatic compound with a dispersion of the alkali metal in mineral oil. A number of other methods for the preparation of these compounds may be employed however. For example, sodium cyclopentadiene has been prepared by the reaction of cyclopentadiene with sodamide.

In the above examples nitrogen was employed as the inert atmosphere to prevent oxygen from coming in contact with the reactants. Other inert gases may also be used, e.g., argon, methane, ethane, propane, and other hydrocarbons and vapors of the solvents employed in the reaction.

The acyl cyclopentadiene compounds which are utilized in the above described process for the preparation of the novel acyl cyclopentadienyl manganese tricarbonyl compounds of this invention are conveniently prepared from an alkali metal-cyclomatic hydrocarbon compound, and an acid halide derived from an organic carboxylic acid. An example of this latter is butanoyl chloride. Thus, propionylmethyl cyclopentadiene is conveniently prepared from sodium methyl cyclopentadienyl and propionyl chloride.

Alternatively, the acyl cyclopentadiene used to prepare the novel acyl cyclopentadienyl manganese tricarbonyl compounds of this invention are prepared by reacting a cyclomatic Grignard reagent with an organic acid halide. Thus, if an exact equivalent of methylcyclopentadienyl mangnesium bromide is added to a solution of 2-methylpropionyl chloride, in the usual manner, 2-methylpropionylmethylcyclopentadiene results.

In addition to the above described method for the preparation of the acyl cyclopentadienyl manganese tricarbonyl compounds of this invention, several alternative preparative methods are applicable. For example, if an excess sodium is used in the process of Example I, the resultant product, after hydrolysis is an α-hydroxyl alkyl cyclopentadienyl manganese tricarbonyl compound which upon treatment with a suitable oxidizing agent such as dichromate, permanganate, hydrogen peroxide and the like, is converted to the corresponding acyl cyclopentadienyl manganese tricarbonyl compound. In conducting the oxidization better yields of the acyl compound is achieved when the α-hydroxyl compound and the oxidizing reagent are reacted in the absence of light.

Further, the process which is exemplified by Examples I through III above is also conveniently carried out with a two equivalent excess of sodium, in which case the product of the carbonylation step, after hydrolysis is an α,α-dihydroxy compound which readily dehydrates to the corresponding acyl cyclopentadienyl manganese tricarbonyl compound.

The compounds of this invention are employed with hydrocarbon fuels and lubricating oils for improving operating characteristics of reciprocating, spark fired, or compression ignition engines. The compounds are used in fuels and lubricating oils by themselves or together with other additive components, such as scavengers, deposit modifying agents containing phosphorus and/or boron, and also other antiknock agents, such as tetraethyllead, etc.

The compounds are conveniently added directly to the hydrocarbon fuels or lubricating oils and the mixture subjected to stirring, mixing, or other means of agitation until a homogeneous fluid results. Alternatively, the compounds of this invention may be first made up into concentrated fluids containing solvents, such as kerosene, toluene, hexane, and the like, as well as other additives such as scavengers, antioxidants and other antiknock agents, e.g., tetraethyllead. Still other components that can be present are discussed more fully hereinbelow. The concentrated fluids can then be added to the fuels.

Where halohydrocarbon compounds are employed as scavenging agents, the amounts of halogen used are given in terms of theories of halogen. A theory of halogen is defined as the amount of halogen which is necessary to react completely with the metal present in the antiknock mixture to convert it to the metal dihalide as, for example, lead dihalide and manganese dihalide. In other words, a theory of halogen represents two atoms of halogen for every atom of lead and/or manganese present. In like manner, a theory of phosphorus is the amount of phosphorus required to convert the lead present to lead orthophosphate, $Pb_3(PO_4)_2$, that is, a theory of phosphorus based on lead represents an atom ratio of two atoms of phosphorus to three atoms of lead. When based on manganese, a theory of phosphorus likewise represents two atoms of phosphorus for every three atoms of manganese, that is, sufficient phosphorus to convert manganese to manganese orthophosphate, $Mn_3(PO_4)_2$.

When employing the compounds of this invention together with scavengers, an antiknock fluid for addition to hydrocarbon fuels is prepared comprising acyl cyclomatic manganese tricarbonyl compounds together with various halogen-containing organic compounds having from 2 to about 20 carbon atoms in such relative proportions that the atom ratio of manganese-to-halogen is from about 50:1 to about 1:12. The scavenger compounds can be halohydrocarbons both aliphatic and aromatic in nature, or a combination of the two, with halogen being attached to carbons either in the aliphatic or the aromatic portions of the molecule. The scavenger compounds may also be carbon, hydrogen, and oxygen-containing compounds, such as haloalkyl ethers, halohydrins, halo esters, halonitro compounds, and the like. Still other examples of scavengers that may be used in conjunction with our manganese compounds either with or without hydrocarbolead compounds are illustrated in U.S. Patents 2,398,281 and 2,479,900–903, and the like. Mixtures of different scavengers may also be used. These fluids can contain other components as stated hereinabove. In like manner, manganese-containing fluids are prepared containing from 0.01 to 1.5 theories of phosphorus in the form of phosphorus compounds. To make up the finished fuels, the concentrated fluids are added to the hydrocarbon fuel in the desired amounts and the homogeneous fluid obtained by mixing, agitation, etc.

The ratio of the weight of manganese to lead in fluids and fuels containing the two components can vary from about 1:880 to about 50:1. When no lead is present, the latter figure becomes 1:0. A preferred range of ratios, however, when both the manganese compounds of this invention and hydrocarbolead compounds are employed, is from about 1:63.4 to about 30:1. For example, the addition of 0.05 gram of manganese per gallon in the form of propionylethylbenzoylcyclopentadienyl manganese tricarbonyl to a commercial fuel having an initial boiling point of 90° F. and a final boiling point of 406° F. and containing 3.17 grams of lead per gallon in the form of tetraethyllead improves the antiknock qualities of the fuel. The ratio of manganese to lead on a weight basis is 1:63.4 in this case. In like manner, the addition of 6 grams of manganese per gallon to the same fuel containing 0.2 gram of lead per gallon in the form of tetraethyllead results in a considerable improvement in the antiknock quality of the fuel. The manganese-to-lead ratio in this case is 30:1.

The following examples are illustrative of fluids and fuels containing our new compounds.

*Example IV*

To 1000 gallons of a commercial fuel having an initial boiling point of 90° F. and a final boiling point of 406° F. is added 102 grams of benzoylmethylcyclopentadienyl manganese tricarbonyl, and a mixture subjected to agitation until the additive is distributed evenly throughout the fuel, in an amount equivalent to 0.015 gram of manganese per gallon of fuel.

Fuels containing mixtures of two or more cyclomatic manganese tricarbonyl compounds, such as mixtures of acetylcyclopentadienyl manganese tricarbonyl and butanylmethylcyclopentadienyl manganese tricarbonyl, are prepared in a manner similar to that employed in this example.

*Example V*

In a manner similar to that employed in the above example, acetylindenyl manganese tricarbonyl is blended with a commercial fuel having an initial boiling point of 94° F. and a final boiling point of 390° F. in an amount equivalent to 10 grams of manganese per gallon.

Fuels containing 6 grams of manganese in the form of n-pentanoylmethylcyclopentadienyl manganese tricarbonyl are prepared in a manner similar to that of Example V.

*Example VI*

To 14.1 parts of acetylmethylcyclopentadienyl manganese tricarbonyl is added 5 parts of ethylene dichloride and mixture agitated until a homogeneous fluid results. The manganese to chlorine atom ratio in this fluid is 1:12 and represents 6 theories of halogen based on the manganese.

In like manner, a fluid is prepared comprising p-methylbenzoylindenyl manganese tricarbonyl and ethylene dibromide in which the manganese to bromine ratio is 1:6, representing 3 theories of bromine based on the manganese. Likewise, a fluid containing n-hexanoylethylcyclopentadienyl manganese tricarbonyl, ethylene bromohydrin, and 2,3-dichloro-1,4-dimethylbenzene is prepared in such proportions that for every 75 atoms of manganese, there are one atom of bromine and two atoms of chlorine, representing the total of 0.02 theory of halogen.

The above fluids are added to hydrocarbon fuels in amounts so as to provide improved fuels containing 0.015 gram, 0.03 gram, 6 grams, and 10 grams of manganese per gallon.

*Example VII*

To 13.2 parts of lead in the form of tetraethyllead in an antiknock fluid containing 0.5 theory of bromine as ethylene dibromide and 1.0 theory of chlorine as ethylene dichloride, wherein the theories of halogen are based upon the amount of lead present, is added 0.015 part of manganese in the form of acetylindenyl manganese tricarbonyl.

This fluid is then added to a commercial hydrocarbon fuel having an initial boiling point of 82° F. and a final boiling point of 420° F. in an amount so as to provide 13.2 grams of lead and 0.015 gram of manganese per gallon.

*Example VIII*

A concentrated fluid is prepared as in Example VII containing kerosene, a blue dye, and 10 parts by weight of manganese as acetylcyclopentadienyl manganese tricarbonyl for every 0.02 part of lead in the form of diethyldimethyllead. This fluid is then blended with a commercial hydrocarbon fuel having an initial boiling point of 90° F. and a final boiling point of 394° F. in an amount sufficient to provide 10 grams of manganese and 0.02 gram of lead per gallon.

In order to illustrate some of the advantages of employing the new acylcyclomatic manganese tricarbonyl compounds as antiknock agents in fuels, tests were conducted in which a single-cylinder CFR knock test engine was operated in fuels containing varying amounts of a compound of this invention. The test method employed was that described in test procedure D–908–51 contained in the 1952 edition of "ASTM Manual of Engine Test Methods" for rating fuels.

The test fuel used was a mixture of gasoline hydrocarbons. Acetylmethylcyclopentadienyl manganese tricarbonyl was added to separate portions of the fuel in amounts sufficient to give concentrations of 0.50 and 1.98 grams of manganese per gallon of fuel.

The fuel with no antiknock additive gave an octane rating of 77.2; when the fuel contained 0.50 gram of manganese or acetylmethylcyclopentadienyl manganese tricarbonyl, the rating increased to an octane number of 84.9. When the manganese level was increased to 1.98, the octane rating was 91.8. As pointed out above, the same fuel requires 4.75 grams of lead per gallon or tetraethyllead to give the same increase in anti-knock effect. Equally good results are obtained when benzolymethylcyclopentadienyl manganese tricarbonyl is tested in the above and other fuels. Further, excellent results are obtained when other compounds of this invention are used, either alone or in conjunction with other additives as pointed out above.

The term "hydrocarbon fuel" pertains to liquid hydrocarbons and is inclusive of mixtures of aliphatic, olefinic, aromatic and naphthenic hydrocarbons derived from mineral sources such as petroleum, coal, shale and tar sands, and which includes straight run, reformed, cracked and alkylated stocks, and mixtures of these. These fuels are ordinarily referred to as gasoline when the initial boiling point is in the range of about 70 to about 90° F. and the final boiling point is in the range of from less than 300 to above 440° F. Further, gasoline is the term applied to fuels which find primary utility in the operation of spark ignition internal combustion engines.

We claim:
1. A mono acyl cyclomatic manganese tricarbonyl compound having the formula:

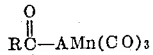

where R is an organic hydrocarbon radical and A is a cyclomatic hydrocarbon radical from the class consisting of cyclopentadienyl and indenyl radicals, said compound being further characterized in that the cyclomatic hydrocarbon radical is bonded to the manganese by carbon-to-manganese bonds through carbons of said cyclopentadienyl group.
2. Monoacetylmethylcyclopentadienyl manganese tricarbonyl.
3. Monobenzoylmethylcyclopentadienyl manganese tricarbonyl.
4. Monobenzoylcyclopentadienyl manganene tricarbonyl.
5. Monoacetylcyclopentadienyl manganese tricarbonyl.

References Cited in the file of this patent

UNITED STATES PATENTS

| 2,086,775 | Lyons et al. | July 13, 1937 |
| 2,409,167 | Veltman | Oct. 8, 1946 |
| 2,596,371 | Chadwick | May 13, 1952 |
| 2,765,327 | Bradley | Oct. 2, 1956 |
| 2,763,613 | Scott et al. | Sept. 18, 1956 |

FOREIGN PATENTS

| 1,080,357 | France | Dec. 8, 1954 |
| 1,097,071 | France | June 29, 1955 |

OTHER REFERENCES

Journal of Inorganic and Nuclear Chemistry, June 1955, vol. 1, Pergamon Press, London, pages 165–174.

Fischer et al.: "Zeit. Naturforsch." 9b, pages 618 (1954).

Weinmayr: "J.A.C.S." 77, 3009–11 (June 5, 1955).

Woodward et al.: "J.A.C.S." 74, 3458-9 (July 5, 1952).